Oct. 25, 1927.

C. L. SHEPPY 1,646,772

RESILIENT DRIVING OR POWER TRANSMITTING DEVICE

Filed Jan. 26, 1922

INVENTOR.
Charles L. Sheppy.
by Parker & Andrews
ATTORNEYS.

Patented Oct. 25, 1927.

1,646,772

UNITED STATES PATENT OFFICE.

CHARLES L. SHEPPY, OF BUFFALO, NEW YORK; ANNABEL F. SHEPPY AND CHARLES GORDON SHEPPY EXECUTORS OF SAID CHARLES L. SHEPPY, DECEASED.

RESILIENT DRIVING OR POWER-TRANSMITTING DEVICE.

Application filed January 26, 1922. Serial No. 531,890.

My invention relates to resilient driving or power transmission mechanisms and more particularly to gears, sprocket wheels and the like, having a resilient connection between the hub and rim of the wheel for absorbing shocks and vibrations between the driving and the driven elements of the gearing or mechanism in which the wheel is used.

One of the objects of my invention is to provide a balanced resilient gear of the above type which will absorb the smallest shocks and vibrations imparted to one of the parts thereof and prevent them from being transmitted to the other part of the wheel and the mechanism with which it connects.

Another object of my invention is to provide a resilient gear of this sort which is constructed so that it can be made in small sizes, permitting the use of the same for operating the cam shafts and indicating instruments of automobile engines. The construction of the wheel embodying my invention is such that, while it can be made substantially as small as the solid wheels ordinarily used between the crank shaft, cam shaft or other instruments in an automobile engine, it will have the advantage over the solid type of driving gear and will absorb or take up the torsional vibrations that occur in gasoline engine crank shafts, and are so destructive to the gears and chains, etc., used to drive the cam shafts and instruments. When used in such connections the wheel embodying my invention permits of the use of other material than metal, such for instance as micarta, linen, raw hide, etc., in the construction of the wheel or of the gearing in which it is used to reduce the noise incident to the gearing.

Another object of my invention is to provide a strong and durable resilient gear wheel of the above type which may be readily and easily manufactured and which shall consist of comparatively few parts.

For the purpose of disclosing my invention I have illustrated one embodiment thereof in the accompanying drawings, in which.

Figure 1:
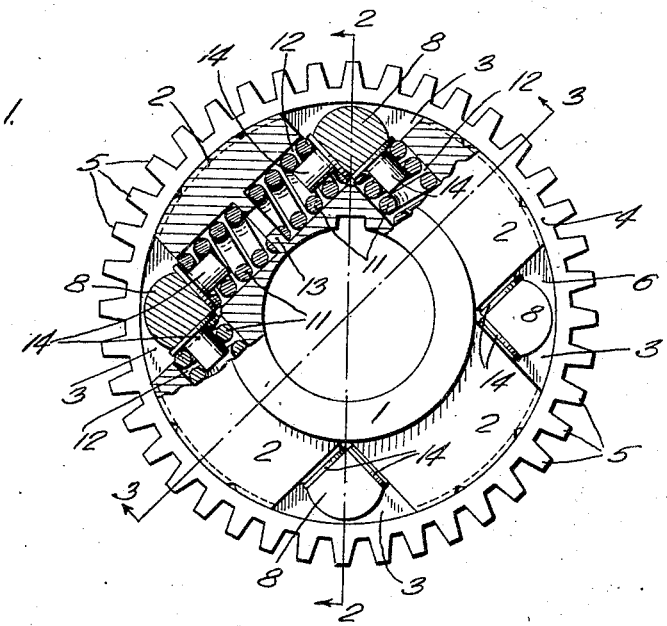
Fig. 1 is a side elevation of a wheel embodying my invention, a portion of the same being shown in section for illustrating the relative arrangement of the parts.
Figure 2:
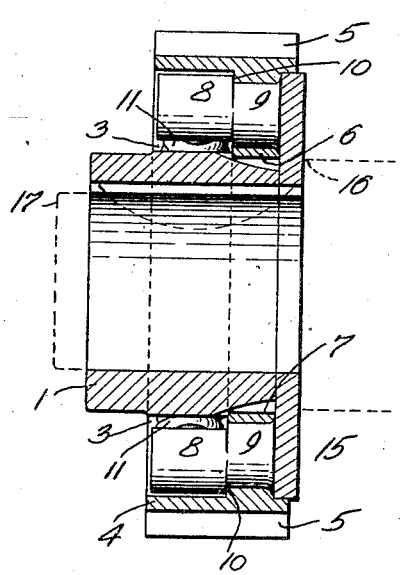
Fig. 2 is a sectional view taken on a line 2—2 of Figure 1.
Figure 3:
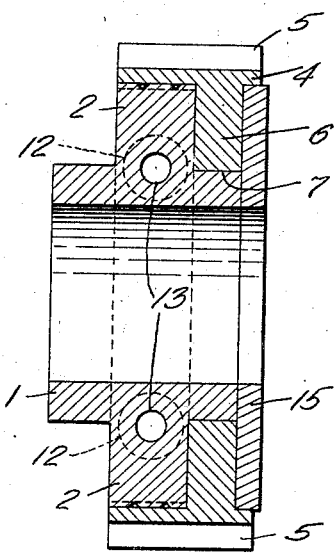
Fig. 3 is a similar view taken on a line 3—3 of Figure 1.

In the wheel illustrated in the accompanying drawings, the hub 1 of the wheel is provided with a plurality of radially extending comparatively wide abutments 2. In the present instance four of these abutments are shown and they are spaced apart by substantially right angular, V-shaped spaces or apertures 3. Any other suitable number of the abutments could, however, be used. The abutments 2 are preferably of less thickness axially of the wheel than the hub and are arranged on the hub intermediate of its ends.

Surrounding the radial abutments 2, which have segmental, circular, outer edges, is a rim 4 having suitable gear teeth 5 on its outer periphery or being of other formation suitable for driving purposes. A portion of the inner surface of this rim bears on the outer edges of the abutments 2, suitable oil grooves being preferably provided in the abutments for lubrication between the rim and the abutments 2. The rim is provided with an annular flange 6 which extends inwardly at one side of the abutments 2 and bears at its inner edge upon the hub 1, the hub being preferably slightly reduced at this point to form a shoulder 7 in alignment with the abutments 2 and against which the flange is adapted to bear. This flange 6 is provided with a plurality of laterally extending studs or abutments 8 which are arranged one in each of the spaces 3 between the abutments 2 and are provided with faces substantially parallel with the opposing edges of the abutments 2. Each stud or abutment 8 is preferably formed by a separate pin having a stem 9 which is reduced in diameter to form a shoulder 10 bearing against the face of the flange 6, and extends through an opening in the flange and is headed over on the rear face of this flange to securely rivet the studs or abutments in position.

Coiled springs 11 are interposed between the rim abutment pins 8 and the hub abutments 2. Preferably these coiled springs are located in the recesses 12 formed in the abutments 2 on the hub and at one end each spring seats on a shoulder 13 formed in the recess, its other end fitting over a plug 14 which bears against the opposing face of an abutment 8. Since the rim abutments 8 are formed by separate pins or pieces, the contacting faces of these abutments and of the bearing plugs 14 for the springs 11 can be readily hardened to reduce the wear on these parts due to the slight relative movement of the same against each other in the use of the wheel, thereby insuring long life and durability of the wheel.

At the rear side of the flange is a thrust collar 15 which fits over the hub 1 and bears against the flange 6 to prevent lateral displacement of the rim relatively to the hub and this collar in turn is held in position by a shoulder 16 on the shaft 17 on which the hub 1 is keyed or secured, although any other means for securing the collar in position may be used.

The springs are arranged in pairs in such a manner that the springs of each pair will act in opposition to one another and thereby produce a balanced spring effect between the hub and the rim. Referring specifically to one pair of the springs 11, one of the springs seating against the shoulder 13 in the recess 12 and bearing against one face of one of the rim abutments 8 will tend to move the abutment 8 to the right, whereas the spring bearing against the opposite face of the abutment and seating in the hub abutment 2 on the opposite side will tend to move the rim abutment to the left so that there is a tendency at all times on the part of the springs to balance the driving and driven members of the gear. This arrangement of the springs with relation to the abutment members provides an extremely sensitive resilient driving gear which will permit a limited relative movement between the rim and hub upon the slightest application of torque to the driving member, and thereby absorb the smallest vibration shocks imposed upon the driving member and prevent these shocks from being imparted to the driven member. In the construction illustrated eight springs are used, four of which oppose the action of the other four, and when any torsional strain is imposed upon the driven member to turn the driving member of the gear, only four of the springs drive in one direction. Any other suitable number of pairs of opposed springs could be employed. Due to the fact that all shocks and vibrations imparted to the driven member by the driving apparatus are taken up by the springs, there is no shock strain imparted to the teeth of the gear, which shocks are so destructive to the teeth, the wheel and especially the rim portion may be formed of micarta, linen, rawhide, etc., to reduce the noise incidental to gear drives.

I claim as my invention:

1. A power transmitting wheel comprising a hub member having outwardly projecting spaced abutments, a rim member which surrounds said abutments and is mounted on said hub member to rotate therewith and also to have a limited rotary movement relative to the hub member, an abutment projecting from said rim member between adjacent sides of said hub abutments, said hub abutments having spring pockets in their adjacent sides and disposed inwardly from the outer ends of said abutments, and coil springs confined and bearing in said spring pockets and exerting opposing pressures on said rim abutment, said springs being of an external diameter substantially equal to the diameter of the spring pockets and of a length not to project substantially out of the spring pockets, the faces of said rim abutment against which said springs act occupying planes disposed at substantial angles to planes radial to the wheel and intersecting said abutment faces.

2. A power transmitting wheel comprising a hub member having outwardly projecting spaced abutments, a rim member which surrounds said abutments and is mounted on said hub member to rotate therewith and also to have a limited rotary movement relative to the hub member, an abutment projecting from said rim member between adjacent sides of said hub abutments, said hub abutments having spring pockets in their adjacent sides and disposed inwardly from the outer ends of said abutments, coil springs confined and bearing in said spring pockets and exerting opposing pressures on said rim abutment, said springs being of an external diameter substantially equal to the diameter of the spring pockets and of a length not to project substantially out of the spring pockets, bearing studs substantially fitting in the outer ends of said springs and contacting with the adjacent faces of said rim abutment in planes disposed at substantial angles to planes radial to the wheel and intersecting said contacting faces of said studs and abutment.

3. A power transmitting wheel comprising a hub member having an outwardly projecting abutment, a rim member which surrounds said abutment and is mounted on said hub member to rotate therewith and also to have a limited rotary movement relative to the hub member, abutments projecting from said rim member at opposite sides of said hub abutment, said hub abutment having spring pockets in its opposite sides disposed inwardly from the outer end of said abutment, and coil springs confined and bearing in said spring pockets and exerting pressure in opposition to each other on said rim abutments, said springs being of an external diameter substantially equal to the diameter of the spring pockets and of a length not to project substantially out of the pockets, the faces of said rim abutments against which said springs act occupying planes disposed at substantial angles to planes radial to the wheel and intersecting said abutment faces.

4. A wheel comprising a hub member, a rim member circumferentially movable with respect to the hub member, one of said members having a plurality of radially arranged spaced apart abutments having a peripheral bearing engagement with the other member and provided with recesses in the opposite edges thereof, the other member having an annular extension having a peripheral bearing engagement with the first member and being prevented from lateral displacement in one direction by said abutments, means for holding said extension against lateral displacement in the opposite direction, laterally extending abutments mounted on said extension and arranged in the spaces between said radial abutments and a plurality of coiled springs interposed between said lateral and radial abutments, arranged in said recesses, each spring having one end seating in a recess and the opposite end acting against a lateral abutment.

5. A wheel comprising a hub member, a rim member surrounding and rotatable on said hub member, one of said members having a strip extending radially toward the other member, said strip having a passage therethrough extending from side to side with its axis in a plane transverse to the axis of said hub, said passage having, intermediate of its ends, a constricted portion forming an annular abutment, helical springs disposed in the ends of said passage against said abutment, and abutments provided upon the other of said members in somewhat spaced relation to the sides of the strip with the springs compressed between the annular and the other abutments, whereby the relative rotation of said members in both directions will be yieldingly resisted by said springs.

6. A wheel comprising a hub member formed of a sleeve and a plurality of arms extending outwardly from the sleeve, a rim member rotatable relatively to the hub member about the axis of the latter and having a portion encircling said sleeve and arms, each arm having a passage from side to side and crosswise thereof, each passage having a constricted portion intermediate of its ends forming an internal annular abutment, pins carried by said rim member between and spaced somewhat from the arms, and helical compression springs in the ends of each passage and compressed between the pins and annular abutments, whereby the relative rotation of said members will be yieldingly resisted by said springs.

CHARLES L. SHEPPY.